(12) United States Patent
Leboe

(10) Patent No.: US 6,893,755 B2
(45) Date of Patent: May 17, 2005

(54) METHOD AND SYSTEM FOR CONTROLLING THE OPERATION OF A HYDROGEN GENERATOR AND A FUEL CELL

(75) Inventor: David Leboe, Vancouver (CA)

(73) Assignee: Cellex Power Products, Inc., Richmond (CA)

( * ) Notice: Subject to any disclaimer, the term of this patent is extended or adjusted under 35 U.S.C. 154(b) by 340 days.

(21) Appl. No.: 10/282,937

(22) Filed: Oct. 28, 2002

(65) Prior Publication Data
US 2004/0080297 A1 Apr. 29, 2004

(51) Int. Cl.[7] .............................. H01M 8/04; H01M 8/06
(52) U.S. Cl. .............................. 429/17; 429/24; 429/25; 429/34
(58) Field of Search .............................. 429/13, 17, 22, 429/24, 25, 34

(56) References Cited

U.S. PATENT DOCUMENTS

| | | | |
|---|---|---|---|
| 5,366,818 A | * | 11/1994 | Wilkinson et al. ............. 429/13 |
| 5,527,632 A | * | 6/1996 | Gardner ..................... 429/17 X |
| 6,322,918 B1 | * | 11/2001 | Kelley et al. ................. 429/17 |
| 6,447,945 B1 | * | 9/2002 | Streckert et al. .............. 429/34 |
| 6,569,549 B1 | * | 5/2003 | Sawyer ........................ 429/13 |
| 2003/0049503 A1 | * | 3/2003 | Ballantine et al. ............ 429/22 |

* cited by examiner

Primary Examiner—Stephen J. Kalafut
(74) Attorney, Agent, or Firm—Oyen Wiggs Green & Mutala (57) ABSTRACT

This application relates to a method and system for controlling the supply of fuel to a dead-ended hydrogen fuel cell. The invention may be utilized, for example, to more efficiently integrate the operation of a hydrogen fuel cell and a hydrogen generator, such as a reformer coupled with a hydrogen separation unit. The invention ensures that the production and consumption of hydrogen are effectively balanced to avoid negative feed line pressure fluctuations. The fuel supply control subsystem and hydrogen consumption control subsystems are, however, "decoupled" and hence independently operable. The invention may include an accumulator disposed in a flow path between the hydrogen generator and the fuel cell for storing hydrogen under pressure. The accumulator is sufficiently large in volume such that the pressure of hydrogen in the flow path does not deviate substantially from a target pressure, even during the waste purging sessions. The system enables the use of low-cost pressure transducers in place of mass flow meters. In one aspect of the invention raffinate flow from the hydrogen separator can be controllably adjusted to regulate the temperature or other operating parameters of the reformer.

56 Claims, 7 Drawing Sheets

METHOD AND SYSTEM FOR CONTROLLING THE OPERATION OF A HYDROGEN GENERATOR AND A FUEL CELL

TECHNICAL FIELD

This application relates to a method and system for controlling the supply of fuel to a dead-ended hydrogen fuel cell. The invention may be utilized, for example, to more efficiently integrate the operation of a hydrogen fuel cell and a hydrogen generator, such as a reformer coupled with a hydrogen separation unit.

BACKGROUND

Fuel cells generate electrical current by consuming hydrogen and oxygen. Hydrogen fuel may be supplied to the fuel cell from a hydrogen generator, such as a steam reformer coupled with a palladium membrane hydrogen separator. The reformer is provided for producing hydrogen from a conventional fuel such as natural gas, propane or methanol. The reformer and hydrogen separator produces a substantially pure hydrogen stream in response to a given feed rate of methanol (or other fuel). This process is inherently slow for larger reformers with significant thermal mass. In a fuel cell system, this pure hydrogen gas produced by the hydrogen generator is consumed by the fuel cell, which is typically "dead-ended" (i.e. hydrogen enters and is consumed and there is no path for excess hydrogen to exit directly—this may include systems that recirculate hydrogen). One challenge in mating the two technologies is that since there is no path for excess hydrogen to escape, production rates of hydrogen from the hydrogen generator must match the consumption rate of hydrogen in the fuel cell otherwise any imbalance will manifest as pressure fluctuations in the hydrogen feed lines between the generator and the fuel cell. Pressure fluctuations may have a negative effect on such a system, for example:

Increasing pressure: An increase in the hydrogen pressure will increase the back pressure on the hydrogen separator which relies on a significant pressure drop to produce a substantially pure hydrogen output stream. This will therefore reduce the hydrogen production rate and will also force excess hydrogen rich gas into the reformer oxidation reactor, potentially leading to an overheating scenario.

Decreasing pressure: A decrease in hydrogen pressure will potentially negatively affect the output of the fuel cell, since fuel cells typically rely on a specific pressure drop across the stack to ensure optimum reaction rates. Even in the case where a hydrogen regulator is used to stabilize this pressure, if the pressure drops below a minimum acceptable level, the pressure may be unacceptable for normal fuel cell operation.

Dead-ended hydrogen fuel cells also generally incorporate a hydrogen purge system which temporarily opens up the "dead-ended" stack to purge contaminants and water which build in concentration during fuel cell operation. This purge briefly and instantaneously requires excess hydrogen from the hydrogen generator which generally cannot be supplied quick enough. The result is a sudden negative pressure fluctuation. Because the purge relies on hydrogen pressure to blow out contaminants, a negative pressure fluctuation may seriously decrease the effectiveness of the purge, which may in turn trigger further purging.

Although some pressure fluctuation can be tolerated, it is advantageous to keep the fluctuations to a minimum and ensure the pressure is substantially stable about a selected operating point.

In addition to maintaining stable hydrogen feed pressure, in certain fuel cell systems it is desirable to run the fuel cell in a quasi-steady state mode (i.e. operating within discrete current output steps) in response to the state of charge of the battery (or other energy storage device). Such a hybrid fuel cell/battery system is described, for example, in Applicant's co-pending U.S. application Ser. No. 09/957,360, now U.S. Pat. No. 6,534,950 the disclosure of which is incorporated herein by reference. Under this strategy the fuel cell will be required to maintain a constant current output for extended durations and then quickly change to a different output level as dictated by the battery state of charge or other external parameters. As current set-points go up, the response time of the fuel cell is not critical (but does affect the recharge time and depth of discharge of the battery) whereas, when set-points go down, the fuel cell must respond quickly so as not to excessively charge and thereby overshoot the voltage threshold of the battery.

This strategy, in combination with the hydrogen feed pressure stabilization requirement, requires the hydrogen generator to operate in a stable output mode for extended periods and quickly load follow on current set-point changes while maintaining a transient response profile directly correlated to the desired transient profile of the fuel cell output current.

The need has therefore arisen for a method and system for effectively integrating the hydrogen processing control requirements of the fuel cell and the hydrogen generator to minimize the negative consequences of hydrogen pressure fluctuations.

SUMMARY OF INVENTION

In accordance with the invention, a method of regulating the current output of a dead-ended hydrogen fuel cell is disclosed. The fuel cell receives a supply of hydrogen produced by a hydrogen generator, such as a reformer. The method comprises the steps of (a) moving a volume of the hydrogen in a flow path from the hydrogen generator to the fuel cell, the hydrogen volume having a target pressure value $p_{set}$; (b) determining a target output current $i_{set}$ for the fuel cell; (c) operating the hydrogen generator at a hydrogen output level sufficient to enable the fuel cell to produce a current approximating the target output current $i_{set}$; (d) measuring the pressure of the volume of hydrogen at a location in the flow path; and (e) if the pressure measured in step (d) differs from $p_{set}$, adjusting the amount of hydrogen consumed by the fuel cell until the pressure of the volume of the hydrogen approximates $p_{set}$.

The flow path disposed between the hydrogen generator and the fuel cell may comprise a hydrogen delivery vessel for containing at least part of the volume of hydrogen. The delivery vessel preferably includes a pressure sensor for measuring the pressure of hydrogen contained therein. The delivery vessel may include (or be in communication with) an accumulator for storing a portion of the hydrogen at pressure. The method may include the step of periodically purging hydrogen from the fuel cell during a time-limited purging session. Preferably the accumulator is sufficiently large in volume such that the pressure of the hydrogen in the flow path does not deviate substantially from $p_{set}$ during the purging session. Adjustment of the amount of hydrogen consumed by the fuel cell is temporarily suspended during the purging session. More generally, the hydrogen generator and the fuel cell may be damped to not respond to high frequency transient hydrogen pressure fluctuations caused by hydrogen purges or otherwise.

The method may include the step of determining a target hydrogen mass flow rate $m_{set}$ for the volume of hydrogen produced by the hydrogen generator corresponding to the target current $i_{set}$ and then operating the hydrogen generator at an output level sufficient to produce a hydrogen mass flow rate approximating $m_{set}$. The hydrogen output level may be estimated in accordance with the following equations:

$$\dot{m}_{in} = \left(\frac{V}{R \cdot T}\right) \cdot \frac{dP}{dt} + \dot{m}_{out} \quad [1]$$

where:

$$\dot{m}_{out} = \frac{n_c \cdot i_{gross}}{2 \cdot F} \quad [2]$$

where $\dot{m}_{in}$ is the estimated mass flow produced by the hydrogen generator and, $\dot{m}_{out}$ is the estimated mass flow of hydrogen consumed by the fuel cell, and wherein V=Volume of hydrogen within the vessel
R=Universal gas constant
T=Temperature of the vessel
dp/dt=Time rate of change of pressure in the vessel
$n_c$=Number of cells in fuel cell stack
$i_{gross}$=Gross current produced by the fuel cell
F=Faradays constant.

In accordance with one aspect of the invention, the hydrogen generator may receive a supply of fuel from a fuel supply subsystem. The step of operating the hydrogen generator at a hydrogen output level sufficient to enable the fuel cell to produce a current approximating the target output current $i_{set}$ comprises (a) measuring the current $i_{gross}$ outputted by the fuel cell; (b) generating a fuel supply control command based on a comparison of $i_{set}$ and $i_{gross}$; and (c) delivering fuel from the fuel supply subsystem to the hydrogen generator in an amount corresponding to the fuel control command. Alternatively, if a target hydrogen mass flow rate $m_{set}$ is calculated corresponding to $i_{set}$ as described above, then the method may comprise the steps of estimating the mass flow rate of the hydrogen supply based on the measured pressure of hydrogen in the flow path and the measured current $i_{gross}$ outputted by said fuel cell; generating a fuel supply control command based on a comparison of $m_{set}$ and the estimated mass flow rate as described above; and delivering fuel from the fuel supply subsystem to the hydrogen generator in an amount corresponding to the fuel supply control command. The fuel supply control command may be generated, such as by a PID controller, based on either feedback or feedforward processes, or a combination thereof.

The method may further comprise generating a hydrogen consumption control command based on a comparison of the measured pressure of the hydrogen within the flow path and $p_{set}$. The hydrogen consumption control command may be delivered directly to the fuel cell for controlling the amount of hydrogen consumed by the fuel cell or to a power converter or fuel cell controller operatively connected to the fuel cell. Preferably the rate of hydrogen consumed by the fuel cell is adjusted at sufficiently frequent intervals to ensure that the pressure of hydrogen in the flow path is maintained between a minimum and a maximum pressure value. For example, the amount of hydrogen consumed by the fuel cell may be adjusted continuously as the measured hydrogen pressure in the flow path differs from $p_{set}$. One advantage of the invention is that the pressure sensor may comprise a low-cost pressure transducer located in the flow path rather than a mass flow meter.

The set points $p_{set}$, $i_{set}$ and $m_{set}$ may be calculated at discrete intervals or may be continuously updated. In one embodiment of the invention the value of $p_{set}$ may depend in part upon the preferred operating temperature of the hydrogen generator. The method may include the step of processing the hydrogen generated by the hydrogen generator to produce a substantially pure hydrogen stream and a hydrogen depleted stream. The hydrogen depleted stream may be diverted to a burner to produce heat useful in regulating the temperature of the hydrogen generator.

The invention also relates to a system for regulating the current output of a dead-ended hydrogen fuel cell receiving a supply of hydrogen produced by a hydrogen generator. The system includes a hydrogen delivery vessel disposed between the hydrogen generator and the fuel cell for delivering a flow of hydrogen from the hydrogen generator to the fuel cell; a pressure sensor located in the delivery vessel for measuring the pressure of the hydrogen; a first controller receiving input from the pressure sensor, wherein the first controller generates a hydrogen consumption control command; a current sensor for measuring the current produced by the fuel cell; and a second controller receiving input from the current sensor, wherein the second controller generates a fuel supply control command. In accordance with the invention, the first controller is operatively connected to the fuel cell to regulate the amount of hydrogen consumed by the fuel cell and the second controller is operatively connected to the hydrogen generator to regulate the amount of hydrogen produced by the hydrogen generator.

Preferably the first controller generates the hydrogen consumption control command based on a comparison of the hydrogen pressure measured by the pressure sensor and a target hydrogen pressure $p_{set}$. In one embodiment the first controller does not receive input from the current sensor.

In a further embodiment of the invention, the second controller generates the fuel supply control command based on a comparison of the fuel cell current measured by the current sensor and a target fuel cell current $i_{set}$. In another embodiment the system includes a hydrogen mass flow processor which receives input from the pressure sensor and the current sensor. The processor calculates a target hydrogen mass flow $m_{set}$ corresponding to $i_{set}$ and a hydrogen mass flow estimate $\dot{m}_{in}$ according to the following formula:

$$\dot{m}_{in} = \left(\frac{V}{R \cdot T}\right) \cdot \frac{dP}{dt} + \dot{m}_{out} \quad [1]$$

where:

$$\dot{m}_{out} = \frac{n_c \cdot i_{gross}}{2 \cdot F} \quad [2]$$

where $\dot{m}_{in}$ is the estimated mass flow produced by the hydrogen generator and, $\dot{m}_{out}$ is the estimated mass flow of hydrogen consumed by the fuel cell, and wherein V=Volume of hydrogen within the vessel
R=Universal gas constant
T=Temperature of the vessel
dP/dt=Time rate of change of pressure in the vessel as measured by the pressure sensor
$n_c$=Number of cells in fuel cell stack
$i_{gross}$=Gross current produced by the fuel cell as measured by the current sensor
F=Faradays constant.

The target hydrogen pressure $p_{set}$ and the target fuel cell current $i_{set}$ may be predetermined or dynamically variable.

The system may also include a power converter operatively connected to the fuel cell for controlling the amount of current drawn from the fuel cell. The hydrogen consumption control command may be transmitted from the first controller to the power converter. Alternatively, the system may include a third controller operatively connected to the fuel cell for controlling the amount of current produced by the fuel cell, and the hydrogen consumption control command may be transmitted from the first controller to the third controller. The system may also include a fuel supply subsystem for delivering fuel to the hydrogen generator, wherein the fuel supply control command is transmitted from the second controller to the fuel supply subsystem.

The system may further include a purge valve operatively connected to the fuel cell to permit periodic expulsion of hydrogen from the fuel cell during a time-limited purging session. The hydrogen delivery vessel may include an accumulator for storing a volume of hydrogen under pressure, the accumulator being sufficiently large in size such that the measured pressure of hydrogen within the vessel does not deviate substantially from $p_{set}$ during the purging session.

In one embodiment the hydrogen generator is a fuel reformer. The system may further include a hydrogen separator for separating the hydrogen produced by the reformer into a hydrogen enriched portion delivered through the hydrogen supply vessel to the fuel cell and a hydrogen depleted portion delivered from the hydrogen separator back to the reformer or a reformer burner. The hydrogen depleted portion may be used to generate heat useful for regulating the temperature of the reformer. A fourth controller may be provided for controlling the reformer temperature. In one embodiment the fourth controller determines the value of $p_{set}$ based at least in part on the target temperature of the reformer.

BRIEF DESCRIPTION OF DRAWINGS

In drawings which illustrate embodiments of the invention but which should not be construed as restricting the spirit or scope of the invention in any way.

DESCRIPTION OF INVENTION

Figure 1:
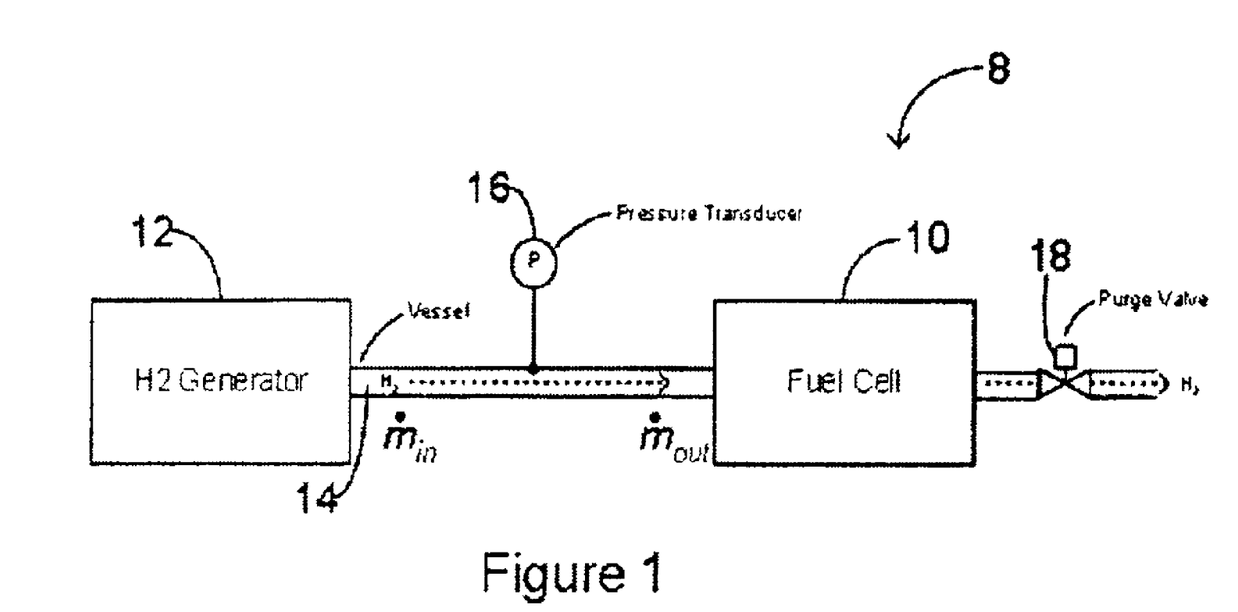
FIG. 1 is a schematic illustration of a fuel cell system according to one embodiment of the invention.

FIG. 1 illustrates schematically one possible embodiment of the Applicant's control system 8 for regulating the supply of fuel to a fuel cell 10. In the illustrated embodiment fuel cell 10 receives a supply of hydrogen fuel from a hydrogen generator 12 through a supply conduit 14. As described further below, hydrogen generator 12 may comprise, for example, a reformer coupled to a hydrogen separator. A pressure sensor 16 is provided for measuring the hydrogen pressure within conduit 14.

Hydrogen fuel cells are typically dead-ended. As used in this patent application "dead-ended" means that hydrogen entering fuel cell 10 is consumed and there is ordinarily no path for excess hydrogen to exit directly (this includes systems that recirculate hydrogen). As shown in FIG. 1, a purge valve 18 may be provided for periodically expelling from fuel cell 10 contaminants and water vapour which build in concentration therein. In particular, the purge system temporarily opens the dead-ended stack to expel the contaminants and water through valve 18. As described below, the purge requires excess hydrogen from hydrogen generator 12 and/or supply conduit 14 to blow out the contaminants.

The sudden release of hydrogen from system 8 during a purge can cause negative pressure fluctuations within generator 12 and conduit 14. For example, a decrease in hydrogen pressure may negatively affect the output of fuel cell 10 since fuel cells typically rely on a specific pressure drop across the fuel cell stack to ensure optimum reaction rates. Conversely, an increase in hydrogen pressure above optimum levels can increase back pressure on hydrogen generator 12 and associated components which may potentially cause overheating as described further below. It is therefore desirable to minimize hydrogen pressure fluctuations, both during normal operation of fuel cell 10 and during purging sessions.

Figure 2:
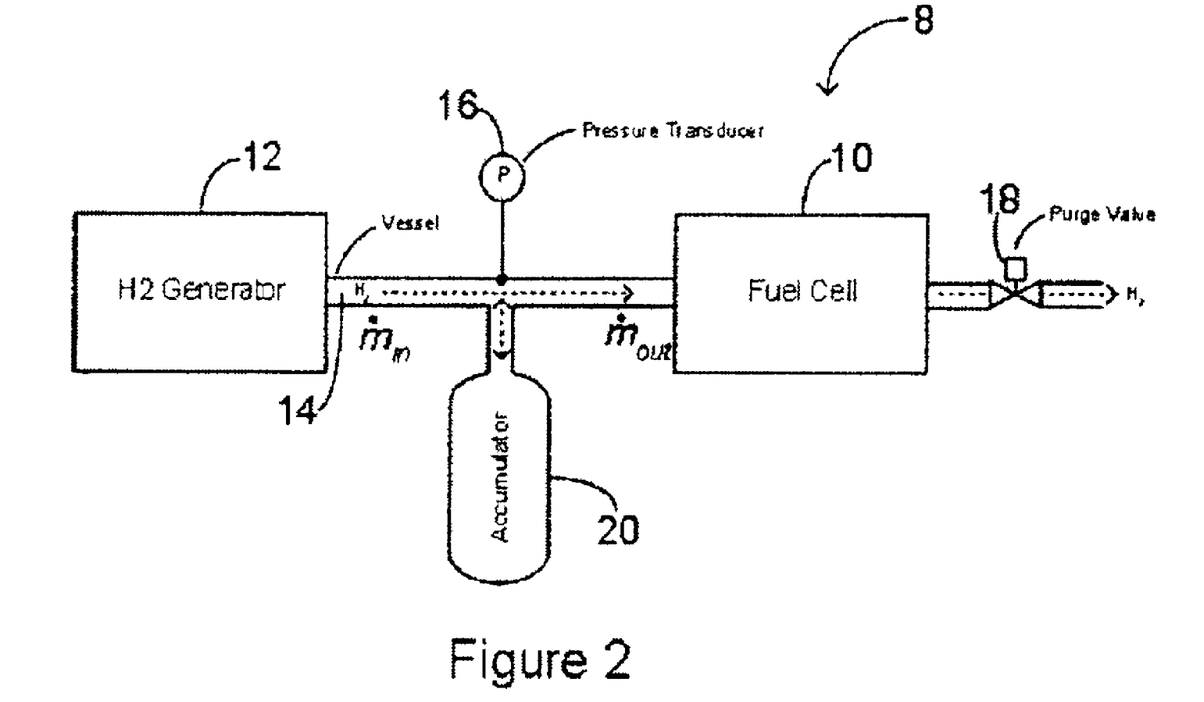
FIG. 2 is a schematic view of an alternative embodiment of the invention employing a hydrogen accumulator.

FIG. 2 illustrates an alternative embodiment of the invention which includes a hydrogen accumulator 20 in communication with hydrogen supply conduit 14. Accumulator 20 stores a supply of hydrogen produced by hydrogen generator 12. Accumulator 20 serves several beneficial functions. First, accumulator 20 serves as source of excess hydrogen gas which is required to periodically purge impurities from fuel cell 10. Accumulator 20 is preferably selected to be of sufficient size so that it will store (at pressure) enough hydrogen to supply the purge volume of hydrogen to fuel cell 10 without causing an excessive pressure decrease at the output of hydrogen generator 12 and without compromising the operation of fuel cell 10. Of course, as will be apparent to a person skilled in the art, the same benefit could be achieved by increasing the volume of supply conduit 14 and hence accumulator 20 is not an essential feature of the invention.

Further, by functioning as a buffer between hydrogen generator 12 and fuel cell 10, accumulator 20 (and/or supply conduit 14) enables the production and consumption of hydrogen fuel to be separately and independently controlled. This feature of the invention is described further below.

Figure 3:
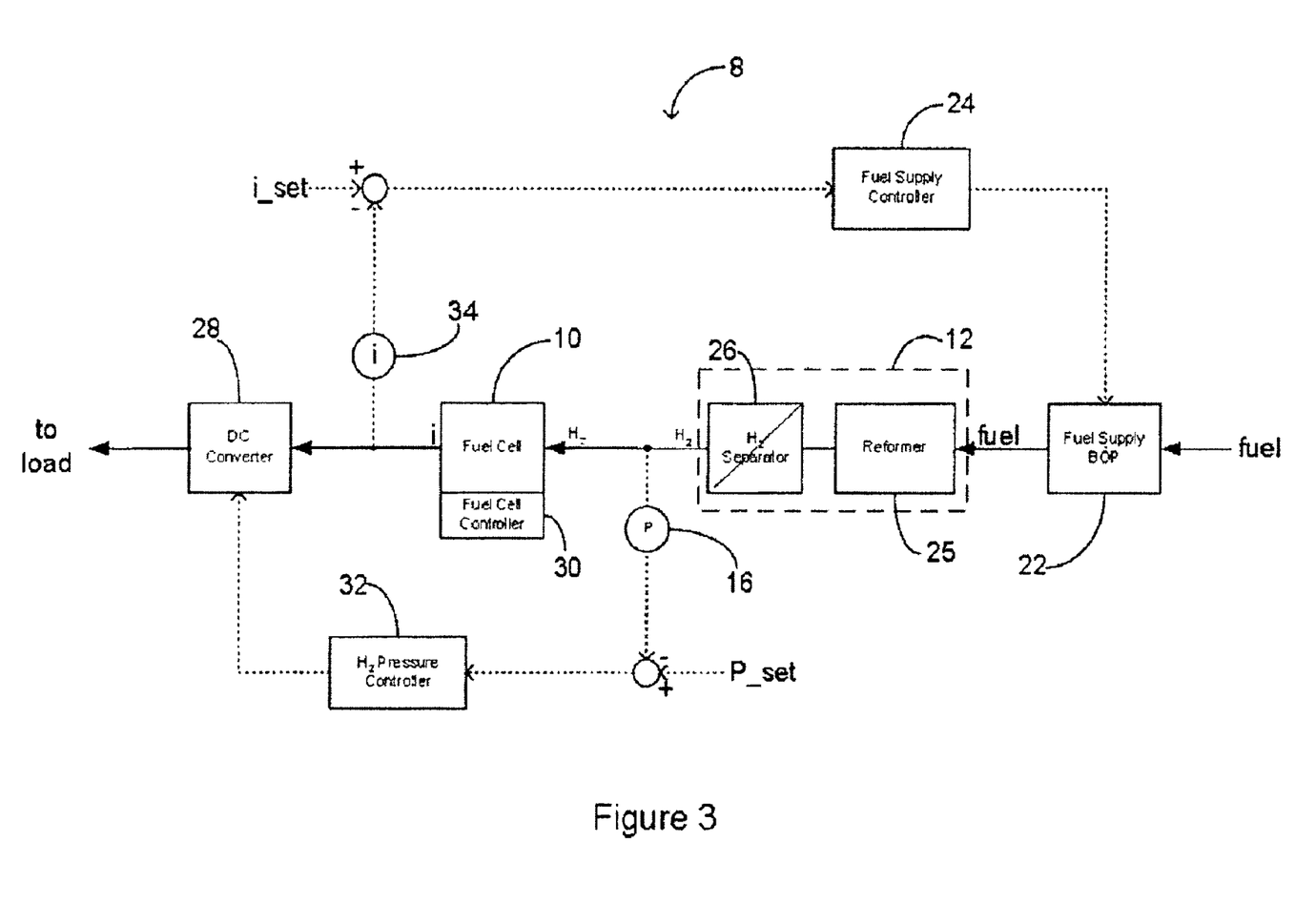
FIG. 3 is a schematic view of a further alternative embodiment of the invention employing hydrogen supply and fuel supply controllers.

FIG. 3 is a schematic view of a further embodiment of the invention. In this embodiment hydrogen generator 12 comprises a reformer 25 which receives a supply of fuel from a fuel supply 22. The operation of fuel supply 22 is regulated by a fuel supply controller 24. In this embodiment hydrogen generator 12 also comprises a hydrogen separator 26 coupled to reformer 25 to produce a substantially pure hydrogen output stream (which is delivered to fuel cell 10 through supply conduit 14). For example, fuel supply 22 may deliver a readily available fuel, such as methanol, to reformer 25 which converts the fuel to hydrogen gas. The hydrogen gas is passed through separator 26 to produce a substantially pure hydrogen output stream. Separator 26 may comprise, for example, a palladium membrane hydrogen separator which requires a significant drop across its membrane to work effectively. Accordingly, hydrogen pressure fluctuations may have a negative effect on the efficiency of separator 26. For example, an increase in hydrogen pressure caused, for example, by an imbalance in hydrogen production and consumption, will increase the backpressure on separator 26 thereby reducing its efficiency. This may in turn reduce the hydrogen production rate and will also force excess hydrogen rich gas into an oxidation reactor or burner associated with reformer 25, potentially leading to an overheating scenario.

As shown in FIG. 3, control system 8 may further comprise a DC converter 28 for regulating the current drawn from fuel cell 10 and delivering the output current to a load. A fuel cell controller 30 may also optionally be provided for controlling the operation of fuel cell 10. System 8 also includes a hydrogen pressure controller 32 which receives input from hydrogen pressure sensor 16. Controller 32 regulates the amount of hydrogen consumed by fuel cell 10 as described further below. Control commands from controller 32 may be optionally delivered to DC converter 28, as in FIG. 3, or to fuel cell controller 30.

Control system 8 includes two separate control subsystems which are separately regulated and hence "decoupled" from one another. The fuel supply control subsystem is regulated by fuel supply controller 24 and controls the amount of hydrogen produced by hydrogen generator 12. The hydrogen consumption control subsystem is regulated by hydrogen pressure controller 32 and controls the amount of hydrogen consumed by fuel cell 10. The hydrogen consumption control subsystem also effectively regulates hydrogen pressure stabilization by ensuring that consumption and production of hydrogen are effectively matched.

In the embodiment of FIG. 3 fuel supply controller 24 receives input from a current sensor 34 which measures the current outputted by fuel cell 10. Controller 24 compares the measured output current to a target current $i_{set}$ for fuel cell 10 which may be predetermined. The value of $i_{set}$ may depend on various external parameters, such as load requirements or the state of charge of an energy storage device (not shown) connected to DC converter 28. For example, a control system for generating discrete $i_{set}$ values depending upon the operating state of a fuel cell/battery hybrid system is described in Applicant's co-pending application Ser. No. 09/957,360, the Disclosure of which is hereby incorporated by reference. Controller 24 compares the measured output current of fuel cell 10 to the target current $i_{set}$ and sends an appropriate fuel supply command (e.g. a pump command) to fuel supply 22 which in turn supplies fuel to hydrogen generator 12. For example, if the measured current is less than the target current, fuel supply 22 may be commanded to increase the supply of fuel to hydrogen generator 12 which will increase hydrogen production accordingly.

Fuel supply controller 24 may also receive other data inputs, such as measured reformer operating state parameters. The fuel supply command generated by controller 24 may therefore depend upon both feedback or feedforward processes, or combinations of both, depending upon the system components selected. By way of example, if the reformer components are well characterized, the control command may be generated principally based on feedforward processing (i.e. the preferred operating parameters of the reformer) and the command may then be tuned based on feedback processing (i.e. the calculated differential between the target mass flow $m_{set}$ and the estimated mass flow calculated as described below). In other words, the control command may comprise a computed signal having both reactive (feedback) and predictive (feedforward) elements, or combinations of both. In one embodiment of the invention controller 24 may be a PID controller or similar device The hydrogen consumption control subsystem is separately regulated by hydrogen pressure controller 32 which receives input from pressure sensor 16. Controller 32 compares the measured hydrogen pressure to a target pressure $p_{set}$ for system 8 which may be predetermined. For example, target pressure $p_{set}$ may depend upon the preferred operating pressure(s) of fuel cell 10 and hydrogen separator 26 or other operating parameters, such as the preferred operating temperature and pressure of reformer 25 (discussed further below). In the embodiment of FIG. 3, controller 32 compares the measured pressure to $p_{set}$ and generates a hydrogen consumption control command which is transmitted to DC converter 28. For example, if the measured hydrogen pressure exceeds the target pressure $p_{set}$, controller 32 may cause DC converter 28 to draw more current from fuel cell 10, resulting in increased hydrogen consumption by fuel cell 10. Alternatively, hydrogen pressure controller 32 could send a control command directly to fuel cell controller 30. In one embodiment of the invention controller 32 may be a PID controller or similar device.

Figure 7:
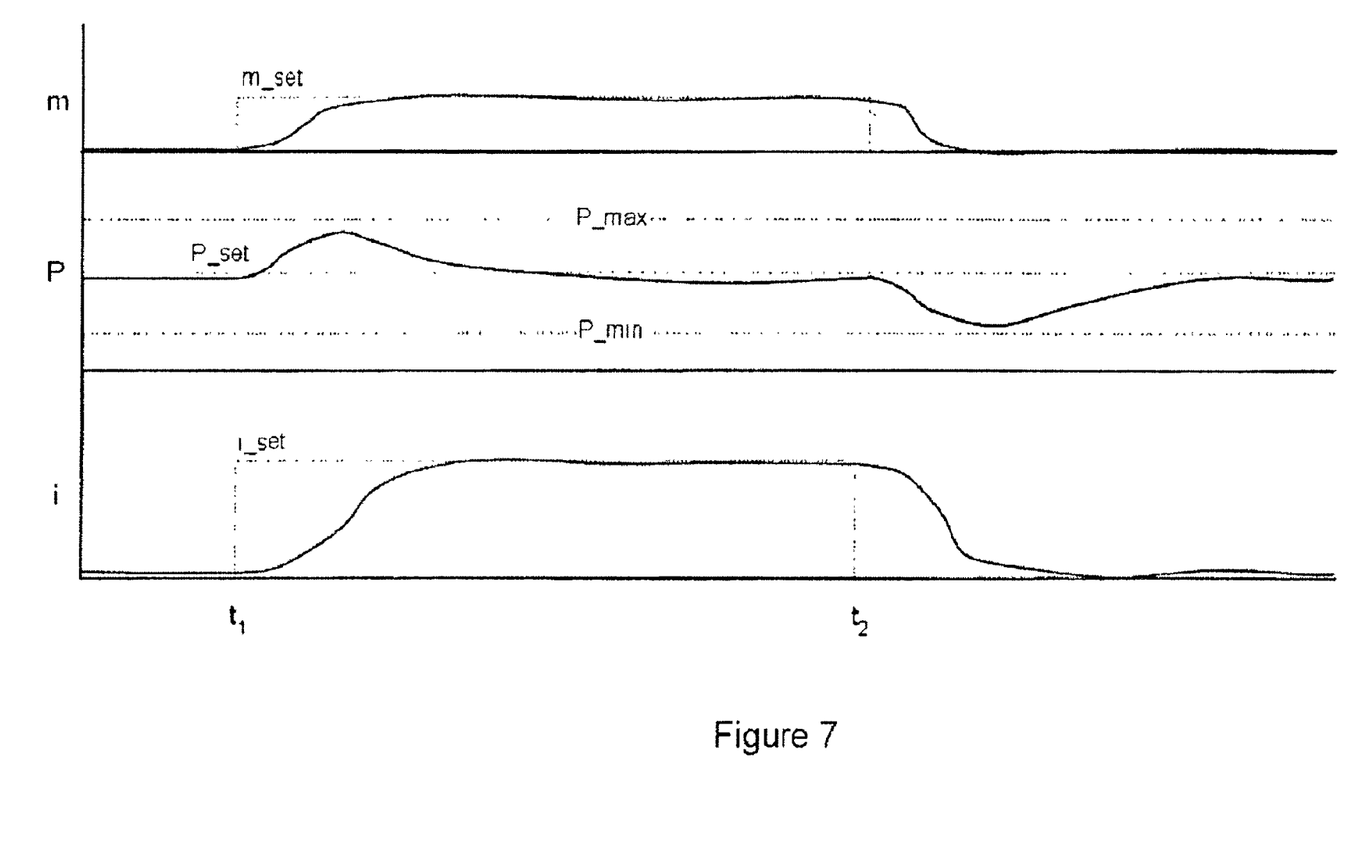
FIG. 7 is a graph showing how hydrogen production, pressure and consumption may vary over time in accordance with the invention.

In one possible embodiment of the invention the hydrogen consumption control subsystem is configured to ensure that the hydrogen pressure will not deviate substantially from the preferred target set point $p_{set}$. For example, the system may be tuned so that the pressure will be maintained within a relatively narrow range between a maximum pressure $p_{max}$ and a minimum pressure $p_{min}$ (FIG. 7).

An important feature of the invention is that the hydrogen consumption control command generated by controller 32 is not directly dependent on the target fuel cell current $i_{set}$. Accordingly, fuel cell 10 is "blind" to current commands and responds only to changes in hydrogen pressure resulting from changes in production of hydrogen by hydrogen generator 12. Thus if hydrogen production by hydrogen generator 12 declines consumption of hydrogen by fuel cell 10 will decline accordingly even if the current necessary to service a load stays the same or increases (fuel cell 10 would be unable to service the load if such operating conditions persisted). In this respect hydrogen generator 12 is the "master" and fuel cell 10 is the "slave". That is, fuel cell 10 regulates its consumption of hydrogen fuel based on changes in fuel production, rather than vice versa.

Figure 4:
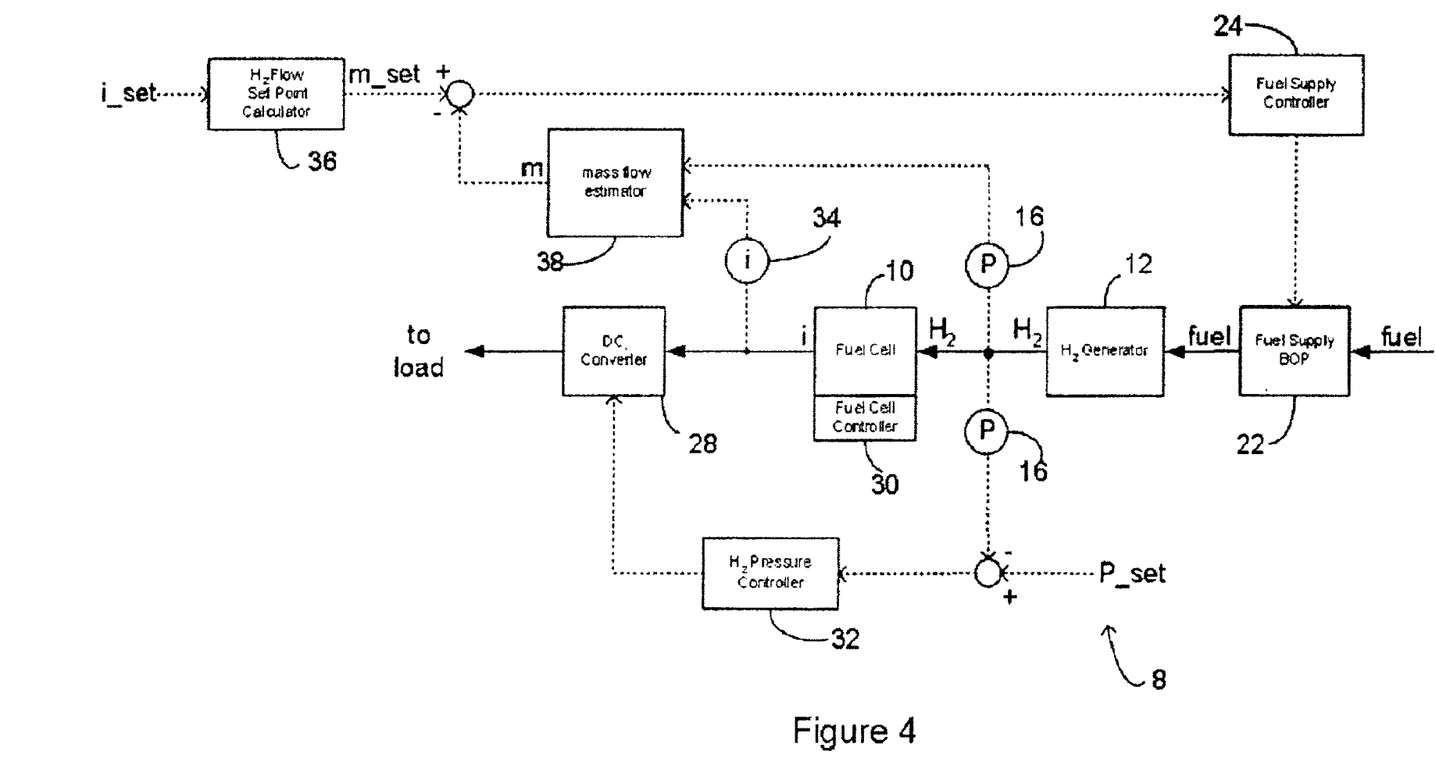
FIG. 4 is a schematic view of a further alternative embodiment of the invention comprising a hydrogen mass flow estimator.

FIG. 4 illustrates a further alternative embodiment of the invention. This embodiment is similar to the embodiment of FIG. 3 but includes some modifications to the fuel supply control subsystem. In particular, the target current $i_{set}$ is converted to a corresponding target hydrogen mass flow $m_{set}$ by a hydrogen set point calculator 36. The fuel supply control subsystem further includes a mass flow estimator 38 which receives input from both pressure sensor 16 and current sensor 34. As indicated above, sensor 16 measures the hydrogen pressure in supply conduit 14 connecting hydrogen generator 12 and fuel cell 10 (FIG. 1) or the hydrogen pressure in accumulator 20 which is in communication with conduit 14 (FIG. 2). Fuel supply controller 24 generates a fuel supply command based on a comparison of the estimated hydrogen mass flow $\dot{m}_{in}$ produced by hydrogen generator 12 and the target mass flow $m_{set}$ as determined by external parameters. Mass flow $\dot{m}_{in}$ is estimated in accordance with the following formula:

$$\dot{m}_{in} = \left(\frac{V}{R \cdot T}\right) \cdot \frac{dP}{dt} + \dot{m}_{out} \quad [1]$$

where:

$$\dot{m}_{out} = \frac{n_c \cdot i_{gross}}{2 \cdot F} \quad [2]$$

where $\dot{m}_{in}$ is the estimated mass flow produced by hydrogen generator 12 and, $\dot{m}_{out}$ is the estimated mass flow of hydrogen consumed by fuel cell 10, and wherein V=Volume of hydrogen within supply conduit 14 (including accumulator 20, if applicable)

R=Universal gas constant

T=Temperature of supply conduit 14 dP/dt=Time rate of change of pressure in supply conduit 14

$n_c$=Number of cells in fuel cell stack $i_{gross}$=Gross current produced by fuel cell 10

F=Faradays constant.

The above equations rely on the ideal gas behavior of dry hydrogen and the simple mass balance of reacted hydrogen in a dead-ended fuel cell 10. The equations are not applicable in the case of fuel cells 10 which are not dead-ended (or during hydrogen purging sessions of dead-ended fuel cells 10). As will be apparent to a person skilled in the art, equation [2] may be similarly used by hydrogen set point calculator 36 to calculate the target mass flow $m_{set}$ (i.e. by substituting the target fuel cell current $i_{set}$ for the measured current $i_{gross}$).

Hydrogen set point calculator 36 and mass flow estimator 38 may be configured as integrated components of fuel supply controller 24 or they could optionally be configured as physically separate data processors.

One advantage of the fuel supply control subsystem of FIG. 4 is that while the fuel cell current may vary slightly due to requirements to stabilize hydrogen feed pressure, no current set point errors are fed back to the hydrogen generator 12 which would result in changes to hydrogen production. Accordingly, the operation of hydrogen generator 12 is not influenced by transient variations in fuel cell current due to temperature fluctuations, operating disturbances and the like. This is because equations [1] and [2] above will account for the pressure fluctuations and allow the hydrogen generator to track its mass flow set point $m_{set}$ independently (i.e. the fuel supply control and fuel consumption control subsystems are "decoupled" from one another). Another advantage of the embodiment of FIG. 4 is that the mass flow rate $\dot{m}_{in}$ may be estimated using a simple pressure sensor 16, such as a low cost pressure transducer, rather than an expensive (and more commonly used) mass flow meter.

Figure 5:
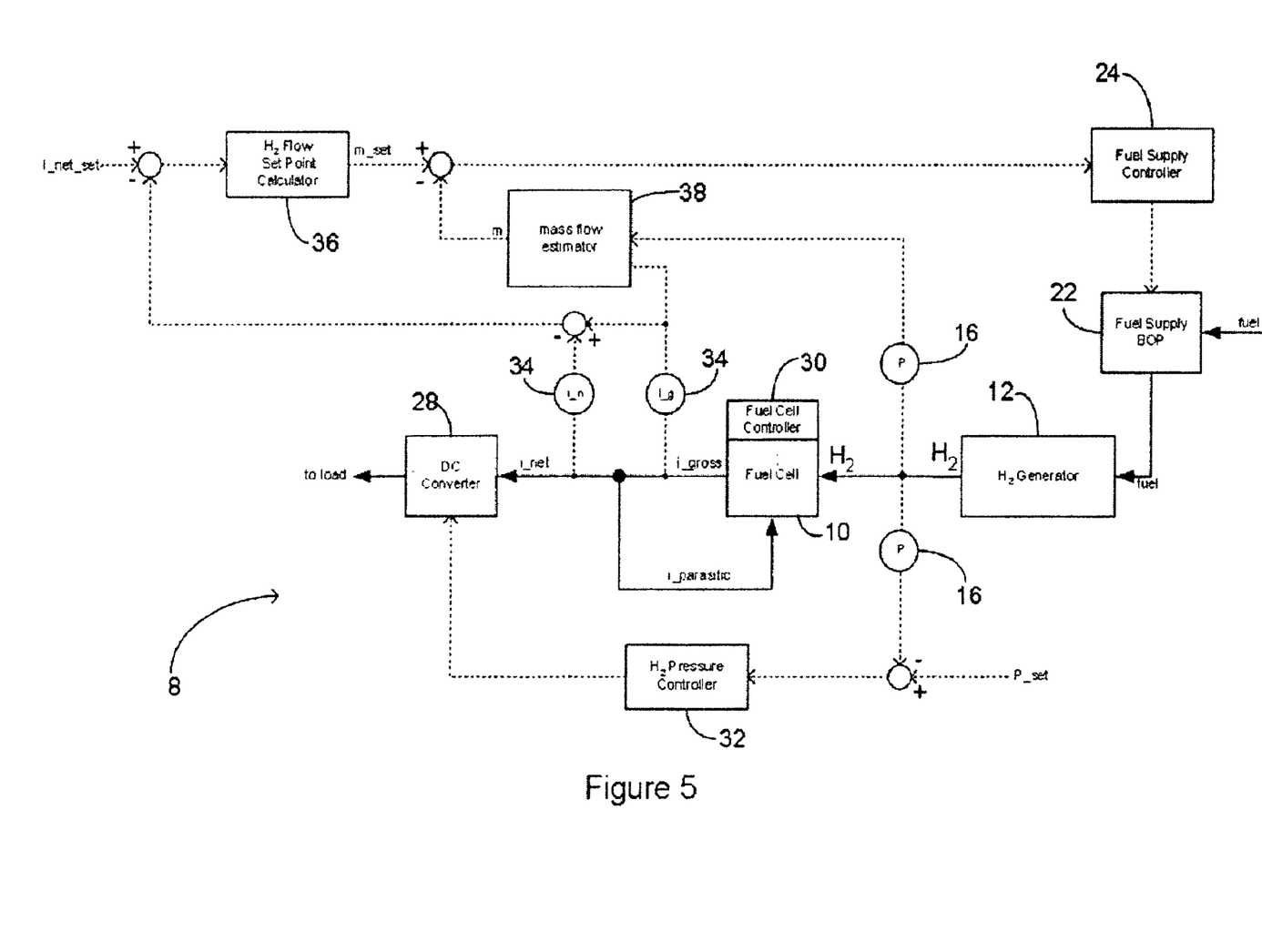
FIG. 5 is a schematic view of a further alternative embodiment of the invention having an integrated fuel cell and fuel cell controller resulting in a parasitic current load.

FIG. 5 illustrates a further alternative embodiment of the invention similar to the embodiment of FIG. 4. In the FIG. 5 embodiment parasitic current loads are accounted for. In particular, fuel cell 10 is integrated with its own controller 30. Controller 30 is powered directly by fuel cell 10 itself resulting in a parasitic load. In this case a net current $i_{net}$ is available to DC converter for servicing the external load. Since the amount of hydrogen consumed is a function of the gross current $i_{gross}$ outputted by fuel cell 10 whereas the target mass flow set point $m_{set}$ depends upon the target net current $i_{net-set}$ available for load servicing or battery charging purposes, the instantaneous parasitic load must be accounted for. This may be accomplished in various ways. One simple approach is by comparing the gross current $i_{gross}$ and net current $i_{net}$ to calculate the instantaneous parasitic load and adjusting the target current set point $i_{net-set}$ accordingly as shown in FIG. 5. Another option would be to measure the parasitic load directly using a sensor (not shown) and then use this measurement to adjust the target current set point request accordingly.

Figure 6:
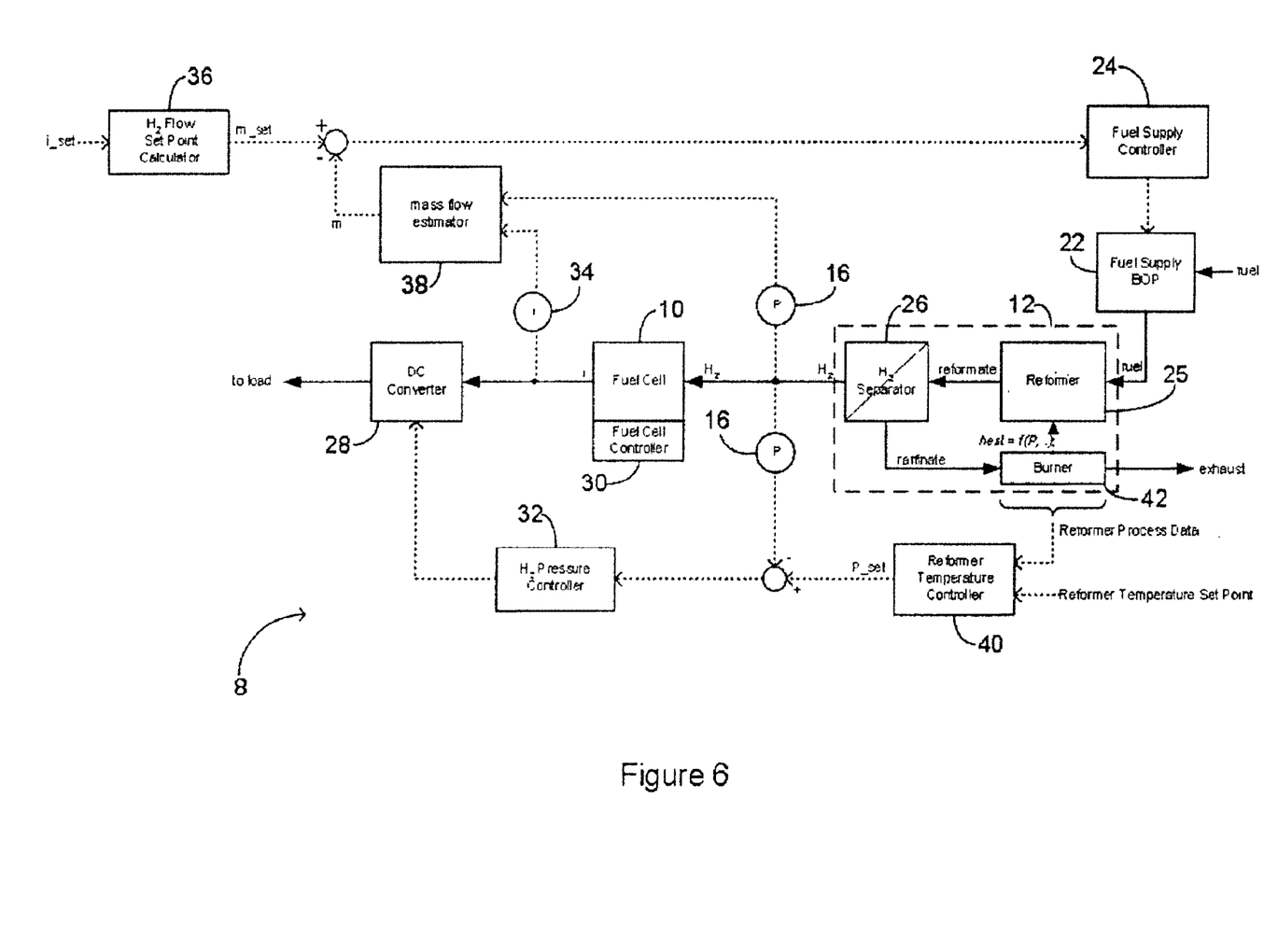
FIG. 6 is a schematic view of a further alternative embodiment of the invention comprising a reformer, a hydrogen separator, a burner, a reformer temperature controller and means for using a hydrogen depleted gas stream to regulate the reformer temperature.

FIG. 6 illustrates an alternative embodiment of the invention similar to the embodiments of FIGS. 3 and 4 but further including a reformer temperature controller 40. In this embodiment of the invention a hydrogen depleted process stream (i.e. raffinate) discharged from hydrogen separator 26 is directed to a burner 42 to generate heat useful for regulating the temperature of reformer 25 (or some other hydrogen generator or hydrogen generator component). Burner 42 may comprise, for example, a catalyst bed or other oxidation reactor capable of converting the raffinate gas stream to heat. Temperature controller 40 generates a target pressure set point $p_{set}$ based on various possible input parameters, such as the target operating temperature $t_{set}$ of reformer 25. Determination of the target pressure set point $p_{set}$ may also depend, in part, upon other operating parameters of reformer 25, the preferred operating pressure of fuel cell 10 and other external influences. The heat generated by burner 42 which is available for regulating the temperature of reformer 25 is in part a function of the pressure of the hydrogen stream. For example, if the temperature of the hydrogen generator 12 is below its preferred target value $t_{set}$, then controller 40 could be configured to increase the hydrogen pressure set point $p_{set}$ by an appropriate increment. This is in turn will result in a change in the composition or relative hydrogen content of the raffinate gas stream available for regulating reformer temperature, as described above.

FIG. 7 is a graph illustrating the ideal response of fuel cell control system 8 as current set points $i_{set}$ change (for example, due to changing load or battery re-charge demands). In operation, when a current set point $i_{set}$ change is requested at time $t_1$, this causes an immediate response from hydrogen generator 12. Referring to the FIG. 4 embodiment by way of example, a new mass flow set point $m_{set}$ is calculated by hydrogen flow set point calculator 36 corresponding to the altered current set point $i_{set}$. The differential detected between the new mass flow set point $m_{set}$ and the actual hydrogen mass flow estimated by mass flow estimator 38 causes fuel supply controller 24 to increase the supply of fuel delivered to hydrogen generator 12 as described above. As shown in FIG. 7, this causes an increase in the hydrogen output of hydrogen generator 12 and a corresponding increase in hydrogen pressure beginning at time $t_1$. In particular, as the mass flow of hydrogen increases, the hydrogen pressure detected by sensor 16 increases above $p_{set}$ toward a maximum pressure value $p_{max}$.

The system next responds by increasing the consumption of hydrogen by fuel cell 10 to match the increased hydrogen production. For example, referring again to the FIG. 4 embodiment, the differential between the measured hydrogen pressure and the target hydrogen pressure $p_{set}$ is detected by hydrogen pressure controller 32 and a control command is transmitted to DC converter 28 to increase the current requested from fuel cell 10. This is turn causes fuel cell 10 to consume more hydrogen to meet the increased current demands. As more hydrogen is consumed by fuel cell 10 and the new current set point $i_{set}$ (and corresponding mass flow set point $m_{set}$) are achieved, the hydrogen pressure gradually declines to once again approximate the target pressure set point $p_{set}$.

At time $t_2$ a new current set point $i_{set}$ is requested corresponding to the original target current (for example, due to decreased load or battery re-charge demands). This results in a corresponding reduction in the mass flow set point $m_{set}$ as described above. The differential between the new target mass flow $m_{set}$ and the actual hydrogen mass flow estimated by mass flow estimator 38 causes fuel supply controller 24 to decrease the supply of fuel delivered to hydrogen generator 12 as described above. As shown in FIG. 7, this causes a decrease in the hydrogen output of hydrogen generator 12 and a corresponding decrease in hydrogen pressure beginning at time $t_2$. In particular, as the mass flow of hydrogen decreases, the hydrogen pressure detected by sensor 16 decreases below $p_{set}$ toward a minimum pressure value $p_{min}$.

The system responds to the decreased production of hydrogen by deceasing the consumption of hydrogen by fuel cell 10 accordingly. For example, referring again to the FIG. 4 embodiment, the differential between the measured hydrogen pressure and the target hydrogen pressure $p_{set}$ is detected by hydrogen pressure controller 32 and a control command is transmitted to DC converter 28 to decrease the current requested from fuel cell 10. This in turn causes fuel cell 10 to consume less hydrogen to match the decreased current demands. As less hydrogen is consumed by fuel cell 10 and the new current set point $i_{set}$ (and corresponding mass flow set point $m_{set}$) are achieved, the hydrogen pressure gradually increases to once again approximate the target pressure set point $p_{set}$.

As will be apparent to a person skilled in the art, a series of incremental changes in fuel cell output may be implemented in a similar manner over the course of an operating period. In one embodiment of the invention, the values of $i_{set}$ and $p_{set}$ may be dynamically updated, either continuously or at discrete time intervals. As described above, this will necessarily result in frequent adjustments to the volume of hydrogen outputted by generator 12 and consumed by fuel cell 10. Although control system 8 ensures that the production and consumption of hydrogen are effectively balanced to avoid negative feed line pressure fluctuations, the fuel supply control subsystem and the hydrogen consumption control subsystems are "decoupled" and hence independently operable as described above.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of regulating the current output of a dead-ended hydrogen fuel cell receiving a supply of hydrogen produced by a hydrogen generator comprising:
    (a) moving a volume of said hydrogen in a flow path from said hydrogen generator to said fuel cell, wherein said volume of said hydrogen has a target pressure value $p_{set}$;
    (b) determining a target output current $i_{set}$ for said fuel cell;
    (c) operating said hydrogen generator at a hydrogen output level sufficient to enable said fuel cell to produce a current approximating said target output current $i_{set}$;
    (d) measuring the pressure of said volume of hydrogen at a location in said flow path; and
    (e) if the pressure measured in step (d) differs from $p_{set}$, adjusting the amount of hydrogen consumed by said fuel cell until the pressure of said volume of said hydrogen approximates $p_{set}$.

2. The method as defined in claim 1, comprising determining a target hydrogen mass flow rate $m_{set}$ for said volume of hydrogen produced by said hydrogen generator corresponding to $i_{set}$.

3. The method as defined in claim 2, comprising operating said hydrogen generator at an output level sufficient to produce a hydrogen mass flow rate approximating $m_{set}$.

4. The method of claim 3, wherein said flow path comprises a hydrogen delivery vessel disposed between said hydrogen generator and said fuel cell for containing at least part of said volume of hydrogen, said delivery vessel having a pressure sensor for measuring the pressure of said volume of said hydrogen.

5. The method of claim 4, wherein said hydrogen delivery vessel comprises an accumulator, said method comprising storing a portion of said volume of said hydrogen at pressure in said accumulator.

6. The method of claim 5, further comprising periodically purging hydrogen from said fuel cell during a time-limited purging session.

7. The method of claim 6, wherein said accumulator is sufficiently large in volume such that the pressure of said portion of said volume of hydrogen contained therein does not deviate substantially from $p_{set}$ during said purging session.

8. The method as defined in claim 1, further comprising periodically purging hydrogen from said fuel cell during a purging session, wherein adjustment of the said amount of hydrogen consumed by said fuel cell is temporarily suspended during said purging session.

9. The method as defined in claim 1, wherein said hydrogen generator and said fuel cell are damped to not respond to high frequency transient hydrogen pressure fluctuations within said vessel.

10. The method of claim 4, wherein said hydrogen mass flow rate is estimated in accordance with the following formula:

$$\dot{m}_{in} = \left(\frac{V}{R \cdot T}\right) \cdot \frac{dP}{dt} + \dot{m}_{out} \quad [1]$$

where:

$$\dot{m}_{out} = \frac{n_c \cdot i_{gross}}{2 \cdot F} \quad [2]$$

where $\dot{m}_{in}$ is the estimated mass flow produced by said hydrogen generator and, $\dot{m}_{out}$ is the estimated mass flow of hydrogen consumed by said fuel cell, and wherein
    V=Volume of hydrogen within the vessel
    R=Universal gas constant
    T=Temperature of the vessel
    dP/dt=Time rate of change of pressure in the vessel
    $n_c$=Number of cells in fuel cell stack
    $i_{gross}$=Gross current produced by the fuel cell
    F=Faradays constant.

11. The method of claim 1, wherein said hydrogen generator receives a supply of fuel from a fuel supply subsystem and wherein the step of operating said hydrogen generator at a hydrogen output level sufficient to enable said fuel cell to produce a current approximating said target output current $i_{set}$ comprises:
    (a) measuring the current $i_{gross}$ outputted by said fuel cell;
    (b) generating a fuel supply control command based on a comparison of $i_{set}$ and $i_{gross}$; and
    (c) delivering fuel from said fuel supply subsystem to said hydrogen generator in an amount corresponding to said fuel control command.

12. The method of claim 3, wherein said hydrogen generator receives a supply of fuel from a fuel supply subsystem and wherein the step of operating said hydrogen generator at a hydrogen output level sufficient to produce a hydrogen mass flow rate approximating $m_{set}$ comprises:

(a) measuring the current $i_{gross}$ outputted by said fuel cell;

(b) estimating the mass flow rate of said volume of said hydrogen based on the measured pressure of said volume of said hydrogen and the measured current $i_{gross}$ outputted by said fuel cell;

(c) generating a fuel supply control command based on a comparison of $m_{set}$ and said mass flow rate estimated in step (b) above; and (d) delivering fuel from said fuel supply subsystem to said hydrogen generator in an amount corresponding to said fuel supply control command.

13. The method as defined in claim 12, wherein said flow path comprises a hydrogen delivery vessel disposed between said hydrogen generator and said fuel cell for containing at least part of said volume of hydrogen, and wherein said mass flow rate is estimated in accordance with the following formula:

$$\dot{m}_{in} = \left(\frac{V}{R \cdot T}\right) \cdot \frac{dP}{dt} + \dot{m}_{out} \quad [1]$$

where:

$$\dot{m}_{out} = \frac{n_c \cdot i_{gross}}{2 \cdot F} \quad [2]$$

where $\dot{m}_{in}$ is the estimated mass flow produced by said hydrogen generator and, $\dot{m}_{out}$ is the estimated mass flow of hydrogen consumed by said fuel cell, and wherein V=Volume of hydrogen within the vessel R=Universal gas constant T=Temperature of the vessel dp/dt=Time rate of change of pressure in the vessel $n_c$=Number of cells in fuel cell stack $i_{gross}$=Gross current produced by the fuel cell F=Faradays constant.

14. The method as defined in claim 13, wherein said hydrogen generator is a reformer.

15. The method as defined in claim 14, wherein said hydrogen delivery vessel is an accumulator for storing a portion of said volume of said hydrogen at pressure.

16. The method as defined in claim 11, wherein said fuel supply control command is generated by a process controller, wherein said method comprises calculating the difference between the target current $i_{set}$ and the measured current $i_{gross}$ and providing said difference as an input to said controller.

17. The method as defined in claim 12, wherein said fuel supply control command is generated by a process controller, wherein said method comprises calculating the difference between the target mass flow rate $m_{set}$ and the estimated actual mass flow rate and providing said difference as an input to said controller.

18. The method as defined in claim 16, comprising measuring at least one operating parameter of said hydrogen generator and providing said measured parameter as an input to said process controller.

19. The method as defined in claim 17, comprising measuring at least one operating parameter of said hydrogen generator and providing said measured parameter as an input to said process controller.

20. The method of claim 1, further comprising controlling the amount of current drawn from said fuel cell.

21. The method as defined in claim 1, comprising generating a hydrogen consumption control command based on a comparison of the measured pressure of said hydrogen within said flow path and $p_{set}$.

22. The method as defined in claim 21, wherein said hydrogen consumption control command is delivered to said fuel cell for controlling the amount of hydrogen consumed by said fuel cell.

23. The method as defined in claim 21, further comprising providing a power converter for controlling the amount of current drawn from said fuel cell, wherein said hydrogen consumption control command is delivered to said power converter.

24. The method as defined in claim 1, comprising adjusting the rate of hydrogen consumed by said fuel cell at sufficiently frequent intervals to ensure that said pressure of said volume of hydrogen in said flow path is between a minimum and a maximum pressure value.

25. The method as defined in claim 1, wherein said amount of hydrogen consumed by said fuel cell is adjusted when said measured pressure of said hydrogen in said flow path differs from $p_{set}$ by a predetermined amount.

26. The method as defined in claim 1, wherein said amount of hydrogen consumed by said fuel cell is adjusted continuously as said measured pressure of said hydrogen in said flow path differs from $p_{set}$.

27. The method as defined in claim 1, wherein said pressure of said volume of hydrogen is measured by a pressure sensor located in said flow path.

28. The method as defined in claim 27, wherein said pressure sensor is a pressure transducer.

29. The method as defined in claim 1, further comprising separating the output of said hydrogen generator into a hydrogen enriched gas stream delivered through said flow path to said fuel cell and a hydrogen depleted gas stream used to regulate the temperature of said hydrogen generator.

30. The method as defined in claim 29, comprising adjusting the value of $p_{set}$ depending upon the desired operating temperature of said hydrogen generator.

31. The method as defined in claim 1, comprising measuring the operating temperature of said hydrogen generator and adjusting the value of $p_{set}$ depending upon the measured operating temperature of said hydrogen generator.

32. The method as defined in claim 11, wherein said fuel supply control command is generated by a process controller which receives data inputs from the group consisting of (a) the differential between $i_{set}$ and $i_{gross}$ and (b) hydrogen generator process data, and wherein the process of generating said control command is either feedback, feedforward or a combination thereof.

33. The method as defined in claim 12, wherein said fuel supply control command is generated by a process controller which receives data inputs from the group consisting of (a) the differential between $m_{set}$ and the estimated mass flow rate and (b) hydrogen generator process data, and wherein the process of generating said control command is either feedback, feedforward or a combination thereof.

34. A system for regulating the current output of a dead-ended hydrogen fuel cell receiving a supply of hydrogen produced by a hydrogen generator comprising:

(a) a hydrogen delivery vessel disposed between said hydrogen generator and said fuel cell for delivering a flow of hydrogen from said hydrogen generator to said fuel cell;

(b) a pressure sensor located in said delivery vessel for measuring the pressure of said hydrogen;

(c) a first controller receiving input from said pressure sensor, wherein said first controller generates a hydrogen consumption control command;

(d) a current sensor for measuring the current produced by said fuel cell; and (e) a second controller receiving input from said current sensor, wherein said second controller generates a fuel supply control command, wherein said first controller is operatively connected to said fuel cell to regulate the amount of hydrogen consumed by said fuel cell and wherein said second controller is operatively connected to said hydrogen generator to regulate the amount of hydrogen produced by said hydrogen generator.

35. The system as defined in claim 34, wherein said first controller generates said hydrogen consumption control command based on a comparison of the hydrogen pressure measured by said pressure sensor and a target hydrogen pressure $p_{set}$.

36. The system as defined in claim 35, wherein said first controller does not receive input from said current sensor.

37. The system as defined in claim 35, wherein said second controller generates said fuel supply control command based on a comparison of the fuel cell current measured by said current sensor and a target fuel cell current $i_{set}$.

38. The system as defined in claim 37, comprising a hydrogen mass flow processor which receives input from said pressure sensor and said current sensor, wherein said hydrogen mass flow processor calculates a target hydrogen mass flow $m_{set}$ corresponding to $i_{set}$ and a hydrogen mass flow estimate $\dot{m}_{in}$ according to the following formula:

$$\dot{m}_{in} = \left(\frac{V}{R \cdot T}\right) \cdot \frac{dP}{dt} + \dot{m}_{out} \quad [1]$$

where:

$$\dot{m}_{out} = \frac{n_c \cdot i_{gross}}{2 \cdot F} \quad [2]$$

where $\dot{m}_{in}$ is the estimated mass flow produced by said hydrogen generator and, $\dot{m}_{out}$ is the estimated mass flow of hydrogen consumed by said fuel cell, and wherein V=Volume of hydrogen within the vessel R=Universal gas constant T=Temperature of the vessel dp/dt=Time rate of change of pressure in the vessel as measure by the pressure sensor $n_c$=Number of cells in fuel cell stack $i_{gross}$=Gross current produced by the fuel cell as measured by the current sensor F=Faradays constant.

39. The system as defined in claim 38, wherein said second controller comprises said mass flow processor.

40. The system as defined in claim 34, further comprising a power converter operatively connected to said fuel cell for controlling the amount of current drawn from said fuel cell.

41. The system as defined in claim 40, wherein said hydrogen consumption control command is transmitted from said first controller to said power converter.

42. The system as defined in claim 34, further comprising a third controller operatively connected to said fuel cell for controlling the amount of current produced by said fuel cell, wherein said hydrogen consumption control signal is transmitted from said first controller to said third controller.

43. The system as defined in claim 37, further comprising a fuel supply subsystem for delivering fuel to said hydrogen generator, wherein said fuel supply control command is transmitted from said second controller to said fuel supply subsystem.

44. The system as defined in claim 37, wherein said target hydrogen pressure $p_{set}$ and said target fuel cell current $i_{set}$ are dynamically variable.

45. The system as defined in claim 37, wherein said target hydrogen pressure $p_{set}$ and target fuel cell current $i_{set}$ are predetermined.

46. The system as defined in claim 35, wherein said system further comprises a purge valve operatively connected to said fuel cell to permit periodic expulsion of hydrogen from said fuel cell during a time-limited purging session.

47. The system as defined in claim 46, wherein said hydrogen delivery vessel comprises an accumulator for storing a volume of said hydrogen under pressure, wherein said accumulator is sufficiently large in size such that the measured pressure of hydrogen within said vessel does not deviate substantially from $p_{set}$ during said purging session.

48. The system as defined in claim 43, wherein said hydrogen generator is a fuel reformer for producing said hydrogen.

49. The system as defined in claim 48, wherein said hydrogen generator comprises a hydrogen separator for separating said hydrogen produced by said reformer into a first portion delivered through said vessel to said fuel cell and a second portion used to heat said reformer.

50. The system as defined in claim 49, further comprising a fourth controller for controlling the temperature of said reformer, wherein said fourth controller determines the value of $p_{set}$ based at least in part on the target temperature of said reformer.

51. The system as defined in claim 37, wherein the value of $i_{set}$ varies depending upon the amount of current drawn from said fuel cell by said power converter as required to service a load or charge a battery.

52. The system as defined in claim 49, wherein said hydrogen separator is a palladium membrane hydrogen separator.

53. The system as defined in claim 34, wherein said first controller is a PID controller.

54. A fuel cell control system comprising:

(a) a dead-ended hydrogen fuel cell;

(b) a hydrogen generator for delivering a supply of hydrogen to said fuel cell;

(c) a hydrogen delivery vessel disposed between said hydrogen generator and said fuel cell for delivering a flow of hydrogen from said hydrogen generator to said fuel cell;

(d) a pressure sensor located in said delivery vessel for measuring the pressure of said hydrogen;

(e) a first controller receiving input from said pressure sensor, wherein said first controller generates a hydrogen consumption control command;

(f) a current sensor for measuring the current produced by said fuel cell; and (g) a second controller receiving input from said current sensor, wherein said second controller generates a fuel supply control command, wherein said first controller is operatively connected to said fuel cell to regulate the amount of hydrogen consumed by said fuel cell and wherein said second controller is operatively connected to said hydrogen generator to regulate the amount of hydrogen produced by said hydrogen generator.

55. The system as defined in claim 54, wherein said first and second controllers are independently operable.

56. The system as defined in claim 54, wherein said first controller does not receive input from said current sensor.

* * * * *